US010104065B2

(12) United States Patent
Wang

(10) Patent No.: US 10,104,065 B2
(45) Date of Patent: Oct. 16, 2018

(54) TOKEN-BASED AUTHENTICATION AND AUTHORIZATION INFORMATION SIGNALING AND EXCHANGE FOR ADAPTIVE STREAMING

(71) Applicant: Futurewei Technologies, Inc., Plano, TX (US)

(72) Inventor: Xin Wang, Rancho Palos Verdes, CA (US)

(73) Assignee: Futurewei Technologies, Inc., Plano, TX (US)

( * ) Notice: Subject to any disclaimer, the term of this patent is extended or adjusted under 35 U.S.C. 154(b) by 188 days.

(21) Appl. No.: 15/161,039

(22) Filed: May 20, 2016

(65) Prior Publication Data

US 2016/0366118 A1 Dec. 15, 2016

Related U.S. Application Data

(60) Provisional application No. 62/166,589, filed on May 26, 2015.

(51) Int. Cl.
*G06F 21/30* (2013.01)
*H04L 29/06* (2006.01)
(Continued)

(52) U.S. Cl.
CPC ........ *H04L 63/083* (2013.01); *H04L 63/0807* (2013.01); *H04L 63/10* (2013.01);
(Continued)

(58) Field of Classification Search
CPC ................................ H04L 63/10; H04L 63/08
(Continued)

(56) References Cited

U.S. PATENT DOCUMENTS 9,026,782 B2  5/2015 Ahuja et al.
2004/0162787 A1  8/2004 Madison et al.
(Continued)

FOREIGN PATENT DOCUMENTS

EP  2723033 A1  4/2014
EP  2779529 A1  9/2014
(Continued)

OTHER PUBLICATIONS

Foreign Communication From a Counterpart Application, PCT Application No. PCT/CN2016/083309, English Translation of International Search Report dated Aug. 19, 2016, 6 pages.
(Continued)

*Primary Examiner* — Izunna Okeke
(74) *Attorney, Agent, or Firm* — Conley Rose, P.C.

(57) ABSTRACT

A method implemented by a network element (NE) configured as a streaming client, the method comprising obtaining, via a processor of the NE, a first authorization token for accessing a first media segment located on a content server, embedding, via the processor, the first authorization token in a first content request message for accessing the first media segment located on the content server, sending, via a transmitter of the NE to the content server, the first content request message comprising the first authorization token to request the first media segment, and receiving, via a receiver of the NE from the content server, the first media segment when the first authorization token is valid for accessing the first media segment located on the content server.

15 Claims, 13 Drawing Sheets

(51) Int. Cl.
  *H04N 21/6334* (2011.01)
  *H04L 29/08* (2006.01)
(52) U.S. Cl.
  CPC ........ *H04L 63/108* (2013.01); *H04L 65/4069* (2013.01); *H04N 21/6334* (2013.01); *H04L 67/02* (2013.01)
(58) Field of Classification Search
  USPC .............................. 726/4, 9, 10, 20, 21, 27
  See application file for complete search history.

(56) References Cited

U.S. PATENT DOCUMENTS

| | | |
|---|---|---|
| 2011/0047566 A1 | 2/2011 | Matuchniak et al. |
| 2014/0115724 A1 | 4/2014 | Van Brandenburg et al. |
| 2015/0096060 A1* | 4/2015 | Ziskind .................. G06F 21/10 726/30 |
| 2015/0113604 A1 | 4/2015 | Oyman |

FOREIGN PATENT DOCUMENTS

| | | | |
|---|---|---|---|
| JP | 2007519303 A | 7/2007 | |
| JP | 2011503742 A | 1/2011 | |
| WO | 2014057197 A1 | 4/2014 | |

OTHER PUBLICATIONS

Foreign Communication From a Counterpart Application, PCT Application No. PCT/CN2016/083309, English Translation of Written Opinion dated Aug. 19, 2016, 7 pages.
"Cross-Platform Authentication," EBU Operating Eurovision and Euroradio Technology Fact Sheet, Sep. 1, 2014, 2 pages.
"Guidelines for Implementation: DASH-IF Interoperability Points," Dash Industry Forum, Version 3.2, Dec. 24, 2015, 147 pages.
"Information Technology—Dynamic Adaptive Streaming over HTTP (DASH)—Part 1: Media Presentation Description and Segment Formats," International Standard ISO/IEC 23009-1, Draft Third Edition, Dec. 7, 2015, 192 pages.
"Online Multimedia Authorization Protocol—An Industry Standard for Authorized Access to Internet Multimedia Resources," Open Authentication Technical Committee, Version 1.0, Aug. 22, 2012, 53 pages.
Foreign Communication From a Counterpart Application, European Application No. 16794196.2, Extended European Search Report dated Mar. 16, 2017, 6 pages.
Foreign Communication From a Counterpart Application, Japanese Application No. 2017-519781, Japanese Office Action dated Feb. 27, 2018, 5 pages.
Foreign Communication From a Counterpart Application, Japanese Application No. 2017-519781, English Translation of Japanese Office Action dated Feb. 27, 2018, 6 pages.

* cited by examiner

```
<EssentialProperty schemeIdUri="urn:org:example:plan-a"
  id="mpeg:dash:client-authentication:2014"
  value="http://domain.com/authenticationServerA/protocolA=ServiceSpecificInfoA"/>     ← 911
<EssentialProperty schemeIdUri="urn:org:example:plan-b"
  id="mpeg:dash:client-authentication:2014"
  value="http://domain.com/authenticationServerB/protocolB=ServiceSpecificInfoB"/>     ← 912
<EssentialProperty schemeIdUri="urn:org:example:plan-c"
  id="mpeg:dash:content-authorization:2014"
  value="http://domain.com/authorizationServerC/protocolC=ContentSpecificInfoC"/>      ← 913
<EssentialProperty schemeIdUri="urn:org:example:plan-d"
  id="mpeg:dash:content-authorization:2014"
  value="http://domain.com/authorizationServerD/protocolD=ContentSpecificInfoD"/>      ← 914
```

FIG. 9

```
<EssentialProperty schemeIdUri="urn:org:example:plan-a"
  id="mpeg:dash:client-authentication:2014"
  value="http://domain.com/authenticationServerA/protocolA=ServiceSpecificInfoA"
  aaToken="nitfHKCrtsiwO2BwPfWw-yZD"/>                                                  ← 1011
<EssentialProperty schemeIdUri="urn:org:example:plan-c"
  id="mpeg:dash:content-authorization:2014"
  value="http://domain.com/authorizationServerC/protocolC=ContentSpecificInfoC"
  aaTokenURL="http://domain.com/authorizationServerD/protocolD=aaToken"/>              ← 1012
```

FIG. 10

```
<AdaptationSet mimeType="video/mp4" segmentAlignment="true" startWithSAP="1" maxWidth="1280"
maxHeight="720" maxFrameRate="25" par="16:9">
  <EssentialProperty schemeIdUri="urn:mpeg:dash:uriparam:2014"
xmlns:up="urn:mpeg:dash:schema:uriparam:2014">
    <up:UriQueryInfo queryString="AASystemId=$AASystemId$&AAToken=$AAToken$"/>
  </EssentialProperty>
  <SegmentTemplate duration="2" startNumber="1" media="video_$Number$_$Bandwidth$bps.mp4"/>
  </SegmentTemplate>
  <Representation id="0" codecs="avc3.4d401f" width="1280" height="720" frameRate="25"
sar="1:1" bandwidth="3000000"/>
  <Representation id="1" codecs="avc3.4d401f" width="640" height="360"
sar="1:1" bandwidth="1500000"/>
</AdaptationSet>
```

FIG. 11

```
<AdaptationSet mimeType="video/mp4" segmentAlignment="true" startWithSAP="1" maxWidth="1280"
maxHeight="720" maxFrameRate="25" par="16:9">
  <EssentialProperty schemeIdUri="urn:mpeg:dash:uriparam:2014"
xmlns:up="urn:mpeg:dash:schema:uriparam:2014">
    <up:UriQueryInfo queryString="AASystemId=$AASystemId$&AAToken=$AAToken$"/>
    <up:UriQueryInfo queryString="AASystemId=$AASystemId$&AAToken2=$AAToken$"/>
  </EssentialProperty>
  <SegmentTemplate duration="2" startNumber="1" media="video_$Number$_$Bandwidth$bps.mp4"/>
  </SegmentTemplate>
  <Representation id="0" codecs="avc3.4d401f" width="1280" height="720" frameRate="25"
sar="1:1" bandwidth="3000000"/>
  <Representation id="1" codecs="avc3.4d401f" width="640" height="360" frameRate="25"
sar="1:1" bandwidth="1500000"/>
</AdaptationSet>
```

FIG. 12

TOKEN-BASED AUTHENTICATION AND AUTHORIZATION INFORMATION SIGNALING AND EXCHANGE FOR ADAPTIVE STREAMING

CROSS-REFERENCE TO RELATED APPLICATIONS

The present application claims priority to U.S. Provisional Patent Application 62/166,589 filed May 26, 2015 by Xin Wang, and entitled "Token-based Authentication and Authorization Information Signaling and Exchange for Adaptive Streaming," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media content to subscribers or users using different encryption and/or coding schemes suited for different devices (e.g., televisions, notebook computers, desktop computers, and mobile handsets). Dynamic adaptive streaming over hypertext transfer protocol (HTTP) (DASH) defines a manifest format, which is referred to as a media presentation descriptor (MPD), and segment formats for International Organization for Standardization (ISO) Base Media File Format (ISO-BMFF) and Moving Picture Expert Group (MPEG) Transport Stream under the family of standards MPEG-2, as described in ISO/International Electrotechnical Commission (IEC) 13818-1, titled "Information Technology—Generic Coding of Moving Pictures and Associated Audio Information: Systems".

A DASH system may be implemented in accordance with the DASH standard described in ISO/IEC 23009-1, entitled, "Information Technology—Dynamic Adaptive Streaming over HTTP (DASH)—part 1: Media Presentation Description and Segment Formats," Dec. 7, 2015, which is incorporated by reference.

SUMMARY

Content protection is important for content provider. Some content delivery service may employ digital right management (DRM) to encrypt data or mark data with digital watermark to allow accesses from authorized users. However, DRM are designed for protecting downloadable file that are consumed statically. DRM does not support the dynamic user-server interactions that are present in content streaming, and thus may not be suitable for use in streaming applications. To resolve these and other problems, and as will be more fully explained below, dynamic token-based authentication and authorization signaling mechanisms are used to protect each content segment during streaming.

In one embodiment, the disclosure includes a method implemented by a network element (NE) configured as a streaming client, the method comprising obtaining, via a processor of the NE, a first authorization token for accessing a first media segment located on a content server, embedding, via the processor, the first authorization token in a first content request message for accessing the first media segment located on the content server, sending, via a transmitter of the NE to the content server, the first content request message comprising the first authorization token to request the first media segment, and receiving, via a receiver of the NE from the content server, the first media segment when the first authorization token is valid for accessing the first media segment located on the content server. In some embodiments, the disclosure also includes sending, via the transmitter to an authentication server, an authentication request message requesting authentication of the streaming client, and receiving, via the receiver from the authentication server, an authentication response message comprising an authentication token before obtaining the first authorization token, and/or embedding the authentication token in the first content request message before sending the first content request message to the content server, wherein the first media segment is further received when the authentication token is valid for accessing the first media segment on the content server, and/or receiving, via the receiver, a media presentation descriptor (MPD) associated with the first media segment after receiving the authentication response message, wherein the MPD comprises a first query indicating that substitution of a segment token parameter is required when accessing the first media segment, and wherein embedding the first authorization token in the first content request message comprises substituting the first authorization token into the segment token parameter, and embedding the segment token parameter comprising the first authorization token in the first content request message, and/or wherein the MPD further comprises an authentication and authorization (AA) system identifier (ID) and a second query indicating that substitution of an AA system ID parameter is required when accessing the first media segment, and wherein the method further comprises substituting the AA system ID into the AA system ID parameter, and embedding the AA system ID parameter in the first content request message before sending the first content request message, and/or wherein the MPD further comprises the first authorization token for accessing the first media segment on the content server, and wherein the first authorization token is obtained from the MPD, and/or wherein the MPD further comprises a uniform resource locator (URL) identifying an authorization server, and wherein obtaining the first authorization token comprises sending, via the transmitter to the authorization server according to the URL, an authorization request message requesting authorization of the streaming client for accessing the first media segment, and receiving, via the receiver, from the authentication server, an authorization response message comprising the first authorization token, and/or wherein the first query further indicates that the segment token parameter is segment dependent, and wherein the method further comprises obtaining, via the processor, a second authorization token for accessing a second media segment located on the content server, substituting the second authorization token into the segment token parameter, embedding, via the processor, the segment token parameter comprising the second authorization token in a second content request message for accessing the second media segment located on the content server, sending, via the transmitter to the content server, the second content request message comprising the second authorization token to request the second media segment, and receiving, via the receiver from the content server, the second media segment from the content server when the second authorization token is valid for accessing the second media segment located on the content server, and/or wherein the first authorization token and the second authorization token are same.

In another embodiment, the disclosure includes a NE configured to implement a streaming client, the NE comprising a processor configured to obtain a first authorization token for accessing a first media segment located on a content server, and embed the first authorization token in a first content request message for accessing the first media segment located on the content server, a transmitter coupled to the processor and configured to send, to the content server, the first content request message comprising the first authorization token to request the first media segment, and a receiver coupled to the processor and configured to receive, from the content server, the first media segment when the first authorization token is valid for accessing the first media segment on the content server. In some embodiments, the disclosure also includes that the transmitter is further configured to send, to an authentication server, an authentication request message requesting authentication of the streaming client, and wherein the receiver is further configured to receive, from the authentication server, an authentication response message comprising an authentication token before obtaining the first authorization token, and/or the receiver is further configured to receive an MPD associated with the first media segment after receiving the authentication response message, wherein the MPD comprises information associated with retrieval of the first authorization token, and wherein the processor is further configured to obtain the first authorization token according to the information in the MPD, and/or the processor is further configured to obtain a client authorization token associated with the streaming client, wherein the client authorization token and the first authorization token are valid for different durations, and embed the client authorization token in the first content request message before sending the first content request message to the content server, and wherein the first media segment is further received when the client authorization token is valid for the streaming client to access the first media segment located on the content server, and/or the first authorization token is not valid for accessing a second media segment located on the content server, wherein the processor is further configured to obtain a second authorization token for accessing the second media segment on the content server, and embed the second authorization token in a second content request message for accessing the second media segment located on the content server, wherein the transmitter is further configured to send, to the content server, the second content request message comprising the second authorization token to request the second media segment, and wherein the receiver is further configured to receive, from the content server, the second media segment when the second authorization token is valid for accessing the second media segment on the content server, and/or the processor is further configured to obtain a third authorization token for obtaining a DRM license associated with the first media segment located on the content server; and embed the third authorization token in a DRM license request message for obtaining the DRM license, wherein the transmitter is further configured to send the DRM license request message comprising the third authorization token to request the DRM license, and wherein the receiver is further configured to receive the DRM license when the third authorization token is valid for obtaining the DRM license.

In yet another embodiment, the disclosure includes a NE configured to implement a content server, the NE comprising a receiver configured to receive a first content request message from a streaming client requesting access to a first media segment, wherein the first content request message comprises a first authorization token, a processor coupled to the receiver and configured to obtain a first verification indicating that the first authorization token is valid, and a transmitter coupled to the processor and configured to send the first media segment to the streaming client when the first authorization token is valid. In some embodiments, the disclosure also includes that the first content request message further comprises an authentication token, wherein the processor is further configured to obtain a second verification indicating that the authentication token is valid, and wherein the transmitter is further configured to send the first media segment to the streaming client when the authentication token is valid, and/or the first authorization token is valid for a first period of time associated with the first media segment, wherein the first content request message further comprises a second authorization token associated with the first media segment and is valid for a second period of time, wherein the processor is further configured to obtain a third verification indicating that the second authorization token is valid, and wherein the transmitter is further configured to send the first media segment to the streaming client when the second authorization token is valid, and/or the first authorization token is not valid for accessing a second media segment, wherein the receiver is further configured to receive a second content request message from the streaming client requesting access to the second media segment, wherein the second content request message comprises a segment-dependent authorization token, wherein the processor is further configured to obtain a fourth verification indicating that the segment-dependent authorization token is valid, and wherein the transmitter is further configured to send the second media segment to the streaming client when the segment-dependent authorization token is valid, and/or the NE is a DASH server.

For the purpose of clarity, any one of the foregoing embodiments may be combined with any one or more of the other foregoing embodiments to create a new embodiment within the scope of the present disclosure These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 9 illustrates an embodiment of a URL template signaling AA schemes in an MPD.

FIG. 10 illustrates an embodiment of a URL template signaling an AA token and an AA token URL.

FIG. 11 illustrates an embodiment of a URL template indicating an URL query information element for querying segment-independent AA information.

FIG. 12 illustrates another embodiment of a URL template indicating URL query information elements for querying segment-independent AA information.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
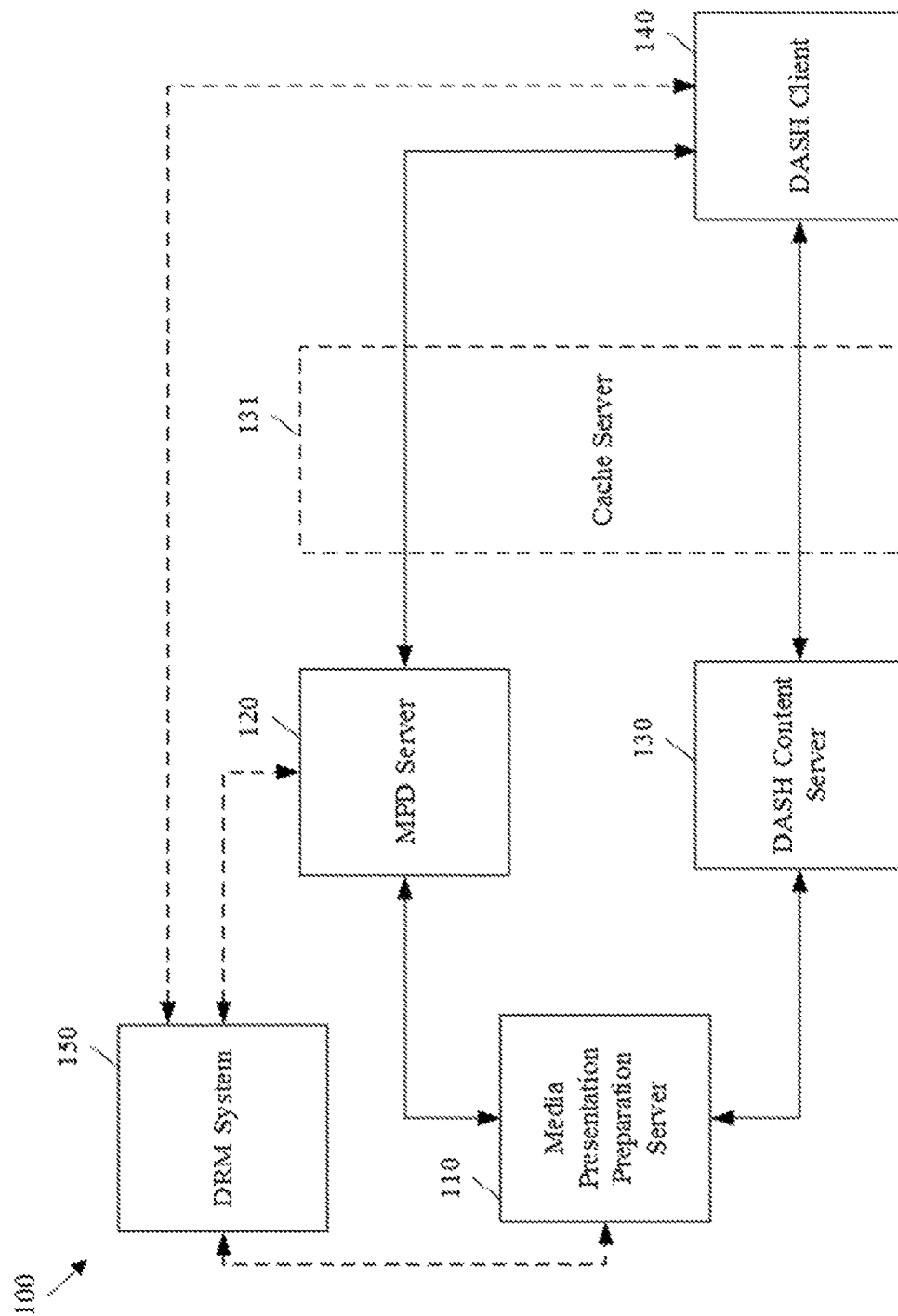
FIG. 1 is a schematic diagram of an embodiment of a DASH delivery system.

FIG. 1 is a schematic diagram of an embodiment of a DASH delivery system 100. The system 100 is described in the ISO/IEC 23009-1, entitled, "Information Technology—Dynamic Adaptive Streaming over HTTP (DASH)—part 1: Media Presentation Description and Segment Formats". The system 100 comprises a media presentation preparation server 110, an MPD server 120, a DASH content server 130, and a DASH client 140. The DASH client 140 is communicatively coupled to the DASH content server 130 and the MPD server 120 via one more networks, which may include an Internet, a wireline network, and/or a wireless network. The media presentation preparation server 110 is communicatively coupled to the DASH content server 130 and the MPD server 120 and may form a portion of a content delivery network (CDN). A CDN refers to a distributed system of servers deployed in multiple data centers over multiple backbones for the purpose of delivering content.

The media presentation preparation server 110 may be any network device such as a hardware computer server configured to prepare media content, which may include videos, audios, and/or texts, in multiple representations for delivery in the system 100 using the DASH protocol. For example, the media presentation preparation server 110 encodes media content using various media encoding schemes to generate an adaptation and store the adaptation set on a disk or any storage devices. An adaptation set includes a plurality of media representations, which may correspond to different bit rates, video frame rates, spatial resolutions, video formats, or combinations thereof. The media presentation preparation server 110 partitions a media representation into a plurality of media segments each corresponding to a short playback interval of the media content. The media segments may be stored at the DASH content server 130 or cached at any other network nodes or servers 131 within the system 100. In addition, the media presentation preparation server 110 generates MPD metadata to describe the media content, such as the different representations, availability of media content, media types, bit rates, resolutions, minimum and/or maximum bandwidths, encoded alternatives of media components, accessibility features and required DRM, and/or other characteristics of the media content. In an embodiment, the media presentation preparation server 110 stores the MPD metadata as extensible markup language (XML) files.

The MPD server 120 may be any network device such as a hardware computer server configured to deliver the MPD metadata to the DASH client 140 upon a request from the DASH client 140. The DASH content server 130 may be any network device such as a hardware computer server configured to deliver media segments to the DASH client 140 upon a request from the DASH client 140. Although FIG. 1 illustrates the media presentation preparation, segment delivery, and MPD deliver functions implemented on separate servers, the media presentation preparation, segment delivery, and MPD delivery functions may be alternatively configured as determined by a person of ordinary skill in the art to achieve similar functionalities.

The DASH client 140 may be any user device such as a notebook computer, a tablet computer, a desktop computer, or a mobile telephone configured to retrieve information of available media content from the MPD server 120 and request delivery of media content from the DASH content server 130. The DASH client 140 begins with downloading MPD metadata from the MPD server 120. The DASH client 140 determines network conditions and selects an appropriate encoded version of the media content according to the information retrieved from the MPD metadata, the network conditions, and/or device capabilities of the DASH client 140. During streaming playback, the DASH client 140 may adaptively select a next media segment from a representation with the highest possible quality level based on network conditions. In an embodiment, the DASH content server 130 is a HTTP server and the DASH client 140 is a HTTP client. In such an embodiment, the DASH client 140 requests media segments from the DASH content server 130 via HTTP requests, and the DASH content server 130 delivers media segments via HTTP responses.

In an embodiment, the system 100 uses a DRM system 150 to protect media content prepared by the media presentation preparation server 110. In such an embodiment, the DRM system 150 is communicatively coupled to the media presentation preparation server 110, the MPD server 120, and the DASH client 150. The DRM system 150 protects content by encrypting data so that the encrypted data may be accessed by authorized users or marking content with a digital watermark so that the content may not be freely distributed. In such an embodiment, the MPD metadata includes a content protection descriptor carrying content protection information such as information associated with the DRM system 150 that grants rights to users such as the DASH clients 140, encryption keys, location of the encryption keys, or combinations thereof. The DASH client 140 uses the carried protection information to acquire licenses, keys and other information from the DRM system 150 to govern the use of the content downloaded to the client device. Since DRM is mainly designed to protect usages of files distributed using file downloading, where a user may download a file onto a user device and consume the downloaded file offline, DRM does not address the dynamic server-client streaming interactions in DASH, where the DASH client 140 fetches media content from the DASH content server 130 segment by segment for streaming during a playback session.

Disclosed herein are various embodiments of token-based AA information signaling and exchange mechanisms for moving picture experts group (MPEG)—DASH and DASH—Industry Forum (IF) based video streaming. Authentication and authorization tokens are proofs that a client or a user of the client has been authenticated and authorized, respectively, in some pre-determined AA systems. In an embodiment, an MPD may include query parameters to request an AA system ID, various types of AA tokens, and various combinations of AA tokens for accessing media segments located on content servers. When a client receives the MPD, the client generates content requests according to the query parameters indicated in the MPD by embedding the required authentication and/or authorization tokens in the content requests. When a content server receives a content request, the content server verifies that the AA tokens provided by the content request are valid before granting access to the content. The content server may perform the verification of the AA tokens or request a verification server to perform the verification. The client may communicate with AA systems using any types of protocols and may communicate with different AA systems to obtain different AA tokens. Although the disclosed embodiments are described in the context of a DASH system, the disclosed embodiments are suitable for any type of streaming system.

Figure 2:
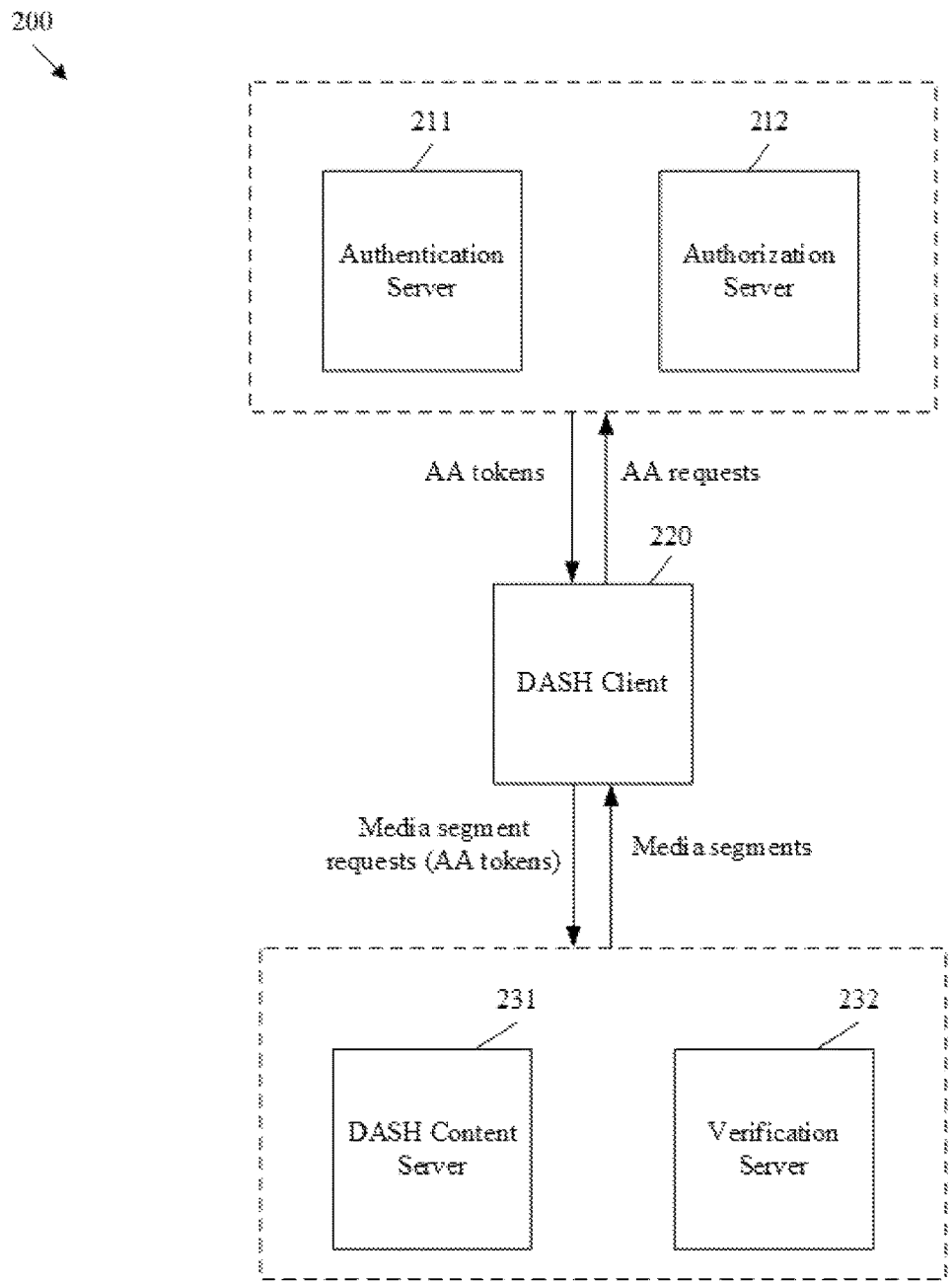
FIG. 2 is a schematic diagram of an embodiment of an AA architecture for a DASH system.

FIG. 2 is a schematic diagram of an embodiment of an AA architecture for a DASH system 200. The system 200 is similar to the system 100, but implements AA when granting accesses to contents. The system 200 comprises an authentication server 211, an authorization server 212, a DASH client 220, a DASH content server 231, and a verification server 232 communicatively coupled to each other via one or more networks, which may include an Internet, a wireline network, and/or a wireless network. The DASH client 220 and the DASH content server 231 are similar to the DASH client 140 and the DASH content server 130, respectively, but perform additional authentication and/or authorization with the authentication server 211, the authorization server 212, and the verification server 232 to protect streaming content in the system 200.

The authentication server 211 may be any network device such as a hardware computer server configured to authenticate the DASH client 220 upon an authentication request from the DASH client 220. Authentication refers to the process of validating a client's identity and/or credential, which may include username and password. The authentication server 211 generates and issues authentication tokens to the DASH client 220 upon successful authentication. The authentication sever 211 may employ any suitable authentication scheme, protocol, and/or standard. The authentication tokens may be in any suitable format, for example, encoded digitally as an opaque string.

The authorization server 212 may be any network device such as a hardware computer server configured to authorize the DASH client 220 upon an authorization request from DASH client 220. Authorization refers to the process of determining whether a client has the permission to access certain resources such as media content. The authorization server 212 generates and issues authentication tokens to the DASH client 220 upon successful authorization. In some embodiments, the authorization process may rely on the authentication of the DASH client 220 performed by the authentication server 211. The authorization sever 212 may employ any suitable authorization scheme, protocol, and/or standard. The authorization tokens may be in any suitable format, for example, encoded digitally as an opaque string.

The verification server 232 may be any network device such as a hardware computer server configured to verify the validity and/or authenticity of authentication tokens and authorization tokens of the DASH client 220.

The DASH client 220 requests authentication from the authentication server 211 and receives an authentication token from the authentication server 211. Similarly, the DASH client 220 requests authorization from the authorization server 212 and receives one or more authorization tokens. The DASH client 220 provides the authentication and/or authorization tokens to the DASH content server 231 as proofs of identity and access permission when requesting media segments from the DASH content server 231. For example, the DASH client 220 embeds an authentication token and/or an authorization token in each media segment request. In some embodiments, different media segments or different collection of media segments are associated with different authorization tokens. Thus, the DASH client 220 may request and receive multiple authorization tokens from the authorization server 212. For example, the DASH client 220 dynamically requests and fetches an authorization token for one or more next segments from the authorization server 212 for streaming during a playback session.

The DASH content server 231 allows the DASH client 220 to access and stream media content when the DASH client 220 provides valid authentication and/or authorization tokens. For example, upon receiving a streaming content request embedded with an authorization token, the DASH content server 231 requests the verification server 232 to verify the authorization token and delivers the media segment to the DASH client 220 upon a successful verification. By associating each segment with an authorization token, the DASH content server 231 may have finer control over the DASH client 220 in terms of media content access. For example, different authorization tokens may be associated with advertisements and a main program of a media content. Thus, the DASH content server 231 may monitor the rate at which the DASH client 220 sends the authorization tokens for the advertisements and control the pace of the verification process so that the DASH client 220 may not skip through the advertisements.

Although FIG. 2 illustrates the authentication server 211 and the authorization server 212 as separate physical servers, the authentication server 211 and the authorization server 212 may be the same server or alternatively a group of servers. In addition, the DASH content server 231 may additionally implement token verifications instead of employing a separate verification server 232. In some embodiments, the authentication server 211 and the authorization server 212 may be operated by a different authoritative and/or administrative entity than the DASH content server 231 and the verification server 232.

The system 200 may further comprise a media presentation preparation server such as the media presentation preparation server 110 and an MPD server such as the MPD server 120. In one embodiment, the authorization tokens are signaled in the MPDs stored on the MPD server 120. In another embodiment, the location of the authorization server 212, for example, in the format of a uniform resource locator (URL), is signaled in the MPDs stored on the MPD server. For example, after the DASH client 220 completed authentication with the authentication server 211, the DASH client 220 downloads an MPD from the MPD server and parses the MPD to obtain an URL of the authorization server 212. Subsequently, the DASH client 220 requests authorization tokens from the authorization server 212. The details of AA information signaling and exchange mechanisms and formats are described more fully below.

Figure 3:
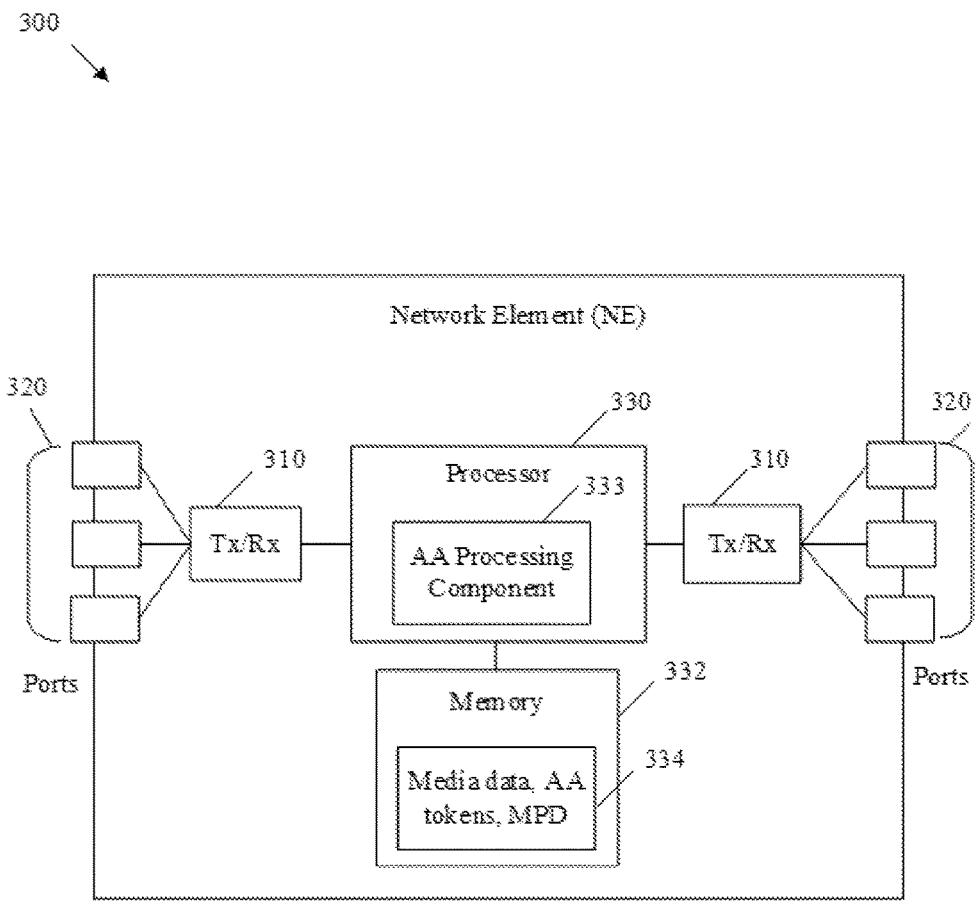
FIG. 3 is a schematic diagram of an embodiment of a NE within a network.

FIG. 3 is a schematic diagram of an embodiment of an NE 300 within a network such as the systems 100 and 200. For example, NE 300 may act as the media presentation preparation server 110, the MPD server 120, the DASH content servers 130 and 231, the DASH clients 140 and 220, the authentication server 211, the authorization server 212, the verification server 232, and/or any other network node in the systems 100 and 200. NE 300 may be configured to implement and/or support the token-based AA mechanisms and schemes described herein. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 300. For instance, the features/methods in the disclosure may be implemented using hardware, firmware, and/or software installed to run on hardware. The NE 300 is any device that transports packets through a network, e.g., a switch, router, bridge, server, a client, etc. As shown in FIG. 3, the NE 300 comprises transceivers (Tx/Rx) 310, which may be transmitters, receivers, or combinations thereof. The Tx/Rx 310 is coupled to a plurality of ports 320 for transmitting and/or receiving frames from other nodes.

A processor 330 is coupled to each Tx/Rx 310 to process the frames and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs). The processor 330 comprises an AA processing component 333, which may perform AA tokens signaling and exchange for streaming and may implement methods 400, 500, 600, 700, 800, 1400, 1500, 1600, and 1700, as discussed more fully below, and/or any other flowcharts, schemes, and methods discussed herein. As such, the inclusion of the AA processing component 333 and associated methods and systems provide improvements to the functionality of the NE 300. Further, the AA processing component 333 effects a transformation of a particular article (e.g., the network) to a different state. In an alternative embodiment, the AA processing component 333 may be implemented as instructions stored in the memory device 332, which may be executed by the processor 330. Further, in the alternative embodiment, the NE 300 may comprise any other means for implementing the methods 400, 500, 700, 800, 1400, 1500, 1600, and 1700.

The memory device 332 may comprise a cache for temporarily storing content, e.g., a random-access memory (RAM). Additionally, the memory device 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 332 is configured to store media data, AA tokens, and MPD 334 depending on the embodiments.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

A DASH delivery system such as the system 200 may employ authentication and/or authorization to allow or restrict certain MPD server providers, end users, end user devices, content distribution system to operate based on rules and/or agreements. In a first scenario, streaming is restricted to a geographical area where an MPD service provider has distribution rights. In a second scenario, streaming is restricted to trusted media players. For example, streaming may present advertisements in videos, MPDs, and/or via signaling insertion to a trusted media player. A trusted media may send back accurate playback reports for service billing. In a third scenario, streaming is restricted to end users who are subscribers or have purchased rental and/or ownership for streaming and/or downloading media content, for example, of a particular media quality format such as standard definition (SD), high definition (HD), and/or ultra-high definition (UHD), for a particular date range or number of views, for particular devices, for particular protection systems, for a maximum number of devices or simultaneous streams, or combinations thereof. In a fourth scenario, streaming may be enabled using federated identity systems, such as television (TV) Everywhere, Ultra-Violet, OpenID, and various single signed on (SSO), and federated rights systems, such as digital entertainment content ecosystem (DECE), KeyChest, and TV Everywhere.

Figure 4:
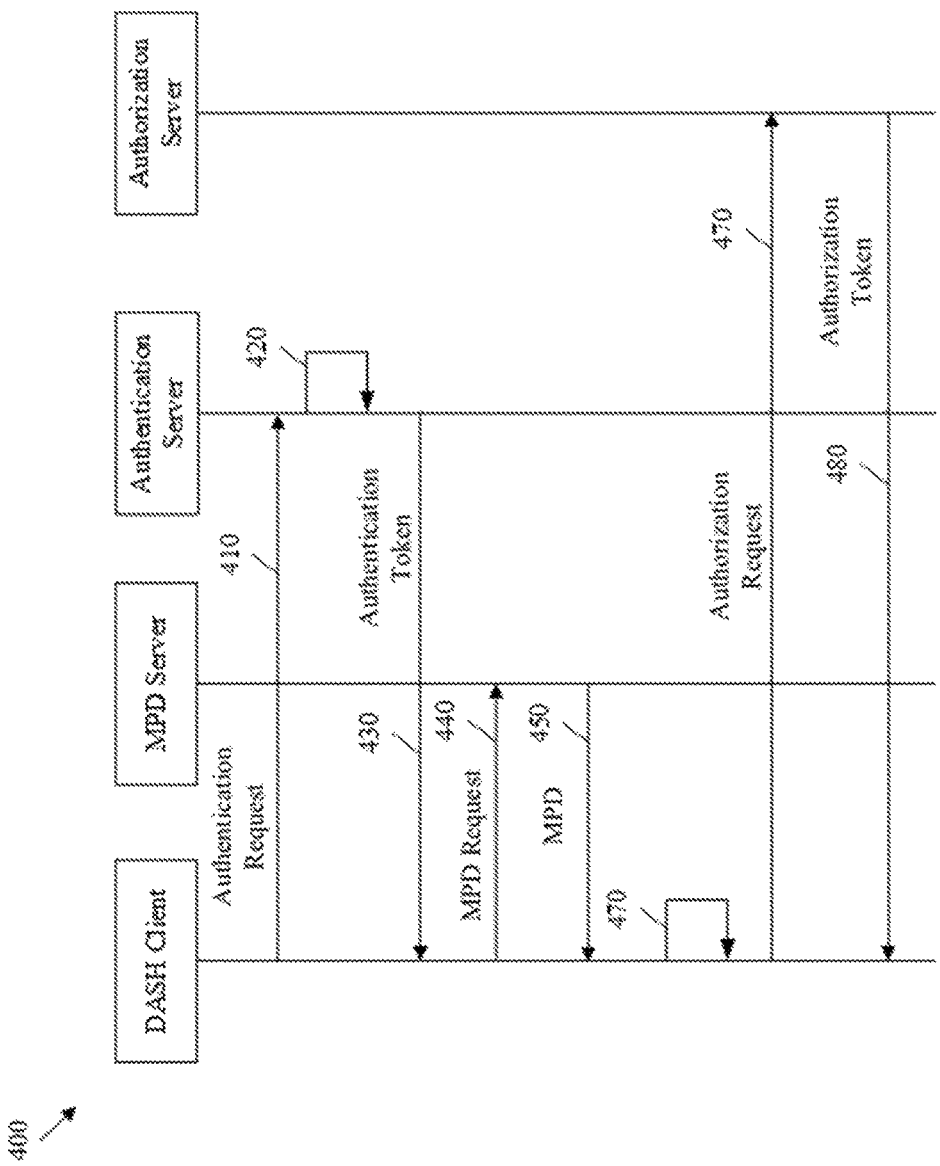
FIG. 4 is a protocol diagram of an embodiment of a method of obtaining AA tokens in a DASH system.

FIG. 4 is a protocol diagram of an embodiment of a method 400 of obtaining AA tokens in a DASH system such as the system 200. The method 400 is implemented between an MPD server such as the MPD server 120, an authentication server such as the authentication server 211, an authorization server such as the authorization server 212, and a DASH client such as the DASH client 220, any of which may be implemented as the NE 300. The method 400 begins when the DASH client begins to access the system 200. At step 410, the DASH client sends an authentication request to the authentication server. For example, the step 410 is initiated when the DASH client logging onto a content streaming service web site. At step 420, the authentication server authenticates the DASH client and/or a media player of the DASH client. For example, the authentication server may perform authentication based on subscription agreements and/or membership of the DASH client. At step 430, upon a successful authentication, the authentication server sends an authentication token to the DASH client. At step 440, the DASH client sends an MPD request to the MPD server. At step 450, the MPD server sends an MPD response to the DASH client. At step 460, upon receiving the MPD response, the DASH client parses the MPD response to retrieve authorization information, which may include an URL of the authorization server. The signaling of the authorization information is described more fully below. At step 470, the DASH client sends an authorization request to the authorization server. At step 480, upon a successful authorization, the authorization server sends an authorization token to the DASH client. After obtaining the authentication token and the authorization token, the DASH client may use the authentication token and/or the authorization token to stream media content in the system. It should be noted that the steps 470 and 480 may be repeated before and during a streaming session. The steps 460-480 may also be employed to obtain an authorization token for DRM, as described more fully below. In addition, in some embodiments, the retrieval of the MPD requires an authorization token in addition to the authentication token. In such embodiments, the DASH client requests a first authorization token after receiving the authentication token at step 430 and embeds both the authentication token and the first authorization token in the MPD request at the step 440. Subsequently, the DASH client obtains a second authorization token according to the MPD response received at step 450 and uses the second authorization token to access media segments. The access of the media segments may require various combinations of authentication token and/or authorization tokens, as described more fully below.

Figure 5:
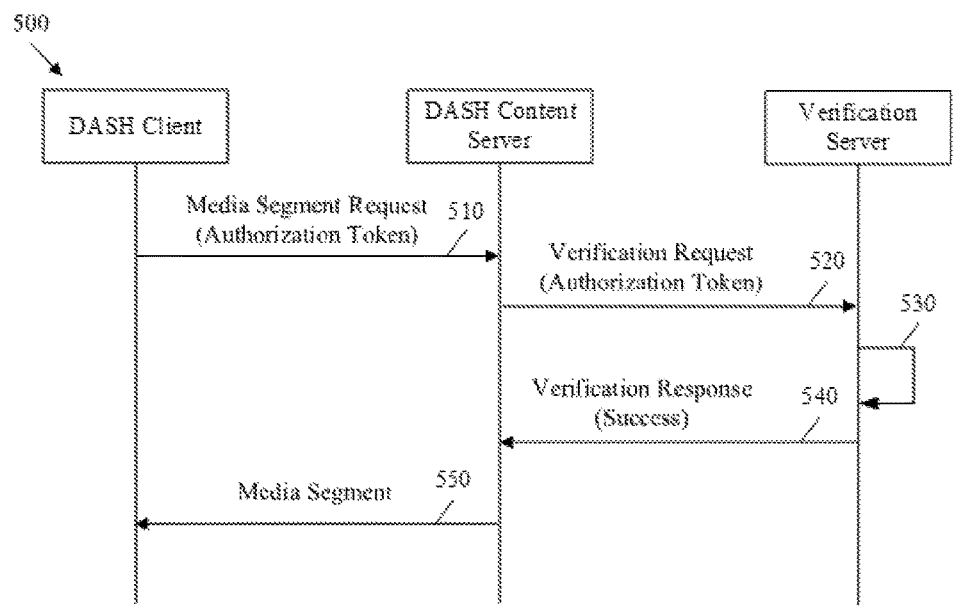
FIG. 5 is a protocol diagram of an embodiment of a method of performing authorization during streaming.
Figure 6:
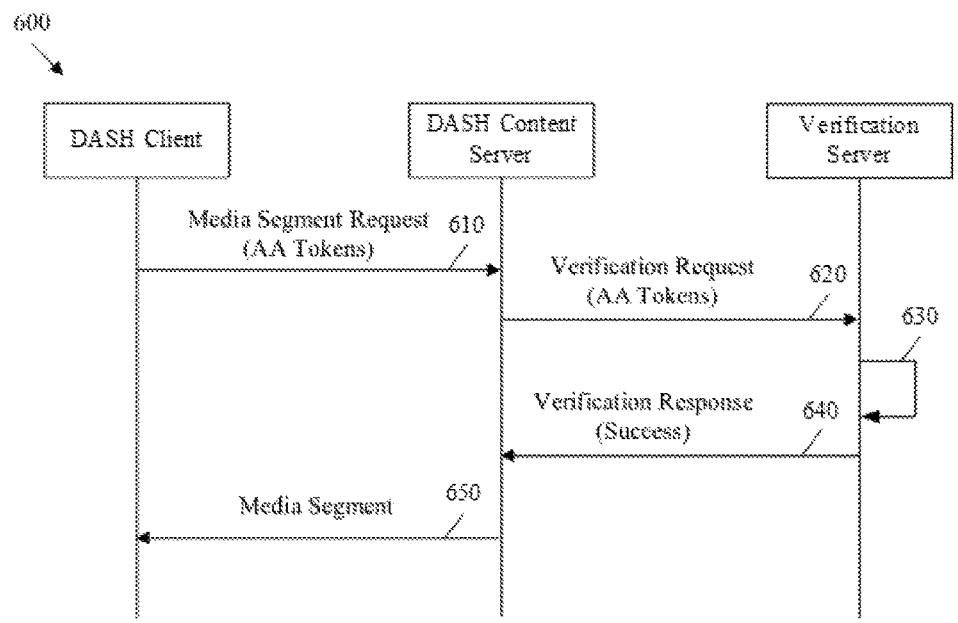
FIG. 6 is a protocol diagram of another embodiment of a method of performing AA during streaming.
Figure 7:
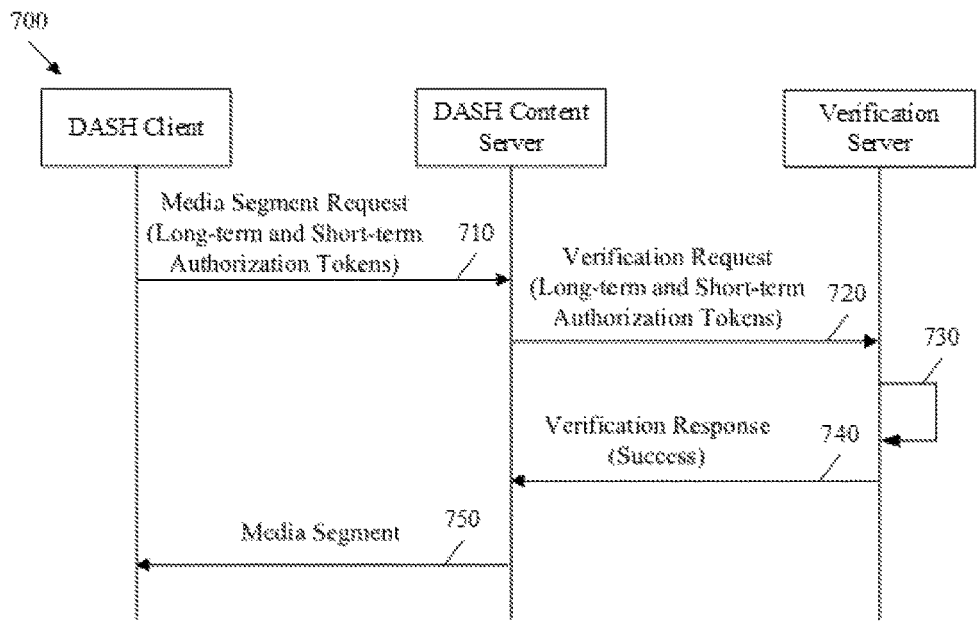
FIG. 7 is a protocol diagram of another embodiment of a method of performing both long-term and short-term authorization during streaming.

FIGS. 5-7 illustrate several use case scenarios of performing AA in a DASH system such as the system 200 between a DASH client such as the DASH client 220, a DASH content server such as the DASH content server 231, and a verification server such as the verification server 232, any of which may be implemented as the NE 300. FIG. 5 is a protocol diagram of an embodiment of a method 500 for performing authorization during streaming. The method 500 begins after the DASH client obtained an authentication token associated one or more media segments using the method 400. At step 510, the DASH client sends a media segment request to the DASH content server requesting a media segment. The media segment request includes the authorization token associated with the requested media segment. At step 520, upon receiving the request, the DASH content server sends a verification request to the verification server requesting verification of the authorization token. At step 530, the verification server verifies that the authorization token is valid. At step 540, the verification server sends a verification response to the DASH content server indicating a successful verification. At step 550, after receiving the verification response, the DASH content server sends the requested media segment to the DASH client. It should be noted that the DASH content server may only send the requested media segment when the verification of the authorization token is successful at step 530. The method 500 may be repeated for a duration of a streaming session. The DASH client may use the same authorization token to fetch all media segments or a collection of media segments, or use a different token for a different media segment.

FIG. 6 is a protocol diagram of another embodiment of a method 600 of performing AA during streaming. The method 600 begins after the DASH client obtained an authentication token associated with the DASH client and/or the DASH client's device and an authorization token associated with one or more media segments using the method 400. At step 610, the DASH client requests a media segment request to the DASH content server requesting a media segment. The media segment request includes both the authentication token associated with the DASH client and the authorization token associated with the media segment in the request. At step 620, upon receiving the request, the DASH content server sends a verification response to the verification server requesting verification of both the authentication token and the authorization token. At step 630, the verification server verifies that both the authentication token and the authorization token are valid. At step 640, the verification server sends a verification response to the DASH content server indicating a successful verification of both the authentication token and the authorization token. At step 650, after receiving the verification response, the DASH content server sends the requested media segment to the DASH client. It should be noted that the DASH content server may only send the requested media segment when the verification of both the authentication token and the authorization token is successful at step 630. The method 600 may be repeated for the duration of a streaming session. The DASH client may use the same authorization token to fetch all media segments or a collection of media segments, or use a different token for a different media segment.

FIG. 7 is a protocol diagram of another embodiment of a method 700 of performing both long-term and short-term authorization during streaming. The method 700 begins after the DASH client obtained a long-term authentication token and a short-term authorization token. Depending on business and security decisions, in some cases, the long-term authorization token is associated with the DASH client, the DASH client's device, or the streaming session, whereas the short-term authorization token is associated with one or more media segments using the method 400, and, in other cases, the short-term authorization token is associated with the DASH client, the DASH client's device, or the streaming session, whereas the long-term authorization token is associated with one or more media segments using the method 400. At step 710, the DASH client sends a media segment request to the DASH content server requesting a media segment. The media segment request includes both the long-term authorization token associated with the DASH client, the DASH client's device, or the streaming session and the short-term authorization token associated with the media segment in the request. At step 720, upon receiving the request, the DASH content server sends a verification request to the verification server requesting verification of both the long-term and short-term authorization tokens. At step 730, the verification server verifies the validity of both the long-term authorization token and the short-term authorization token. At step 740, the verification server sends a verification response to the DASH content server indicating a successful verification of both the long-term and short-term authorization tokens. At step 750, after receiving the verification response, the DASH content server sends the requested media segment to the DASH client. It should be noted that the DASH content server may only send the requested media segment when the verification of both the long-term and short-term authentication tokens is successful at step 730. The method 700 may be repeated for the duration of a streaming session. The DASH client may use the same authorization token to fetch all media segments or a collection of media segments, or use a different token for a different media segment.

Figure 8:
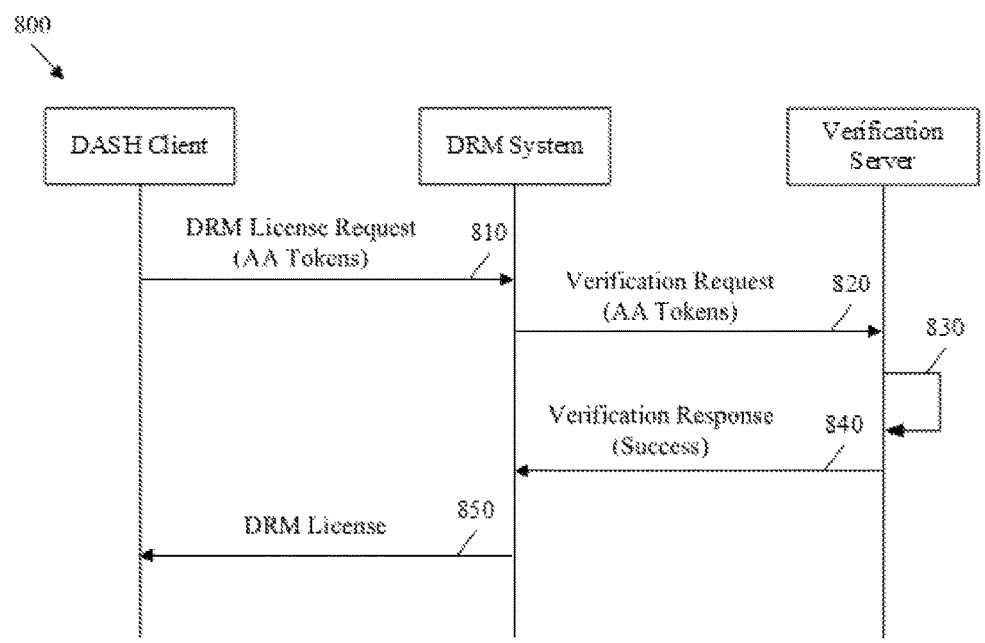
FIG. 8 is a protocol diagram of an embodiment of a method of performing authorization to obtain a DRM license.

FIG. 8 is a protocol diagram of an embodiment of a method 800 of performing authorization to obtain a DRM license. The method 800 is implemented between a DASH client such as the DASH client 220 and a DRM system such as the DRM system 150, any of which may be implemented as the NE 300. The method 800 begins after the DASH client obtained some authentication and an authorization tokens that are needed for license acquisition. At step 810, the DASH client sends a DRM license request to a DRM system requesting a DRM license. The DRM license request includes these authentication and authorization tokens in the request. At step 820, upon receiving the request, the DRM system sends a verification request to the verification server requesting verification of the authentication and authorization tokens. At step 830, the verification server verifies the validity of the authentication and authorization tokens. At step 840, the verification server sends a verification response to the DASH content server indicating a successful verification of the authentication and authorization tokens. At step 850, after receiving the verification response, the DRM system server sends a DRM license to the DASH client. It should be noted that the DRM system may only send the DRM license when the verification of the authentication and authorization tokens is successful at step 830.

A DASH system such as the system 200 may signal and exchange AA information between the servers and client. One embodiment is to leverage the authentication and authorization descriptors and the URL query parameter insertion mechanisms described in the ISO/IEC document 23009-1. The authentication and authorization descriptors are signaled in MPDs. The URL query parameter insertion mechanisms insert URLQueryInfo elements in MPDs to request feedbacks from a DASH client such as the DASH clients 140 and 220. For example, the authentication and authorization descriptors can be extended to signal possible AA schemes, protocols, and/or standards and/or possible servers for obtaining AA tokens. The authentication and authorization descriptors may also carry AA tokens and/or signal URLs where AA tokens may be retrieved when the AA tokens or the URLs are available. The URL query parameter insertion mechanisms can be extended to signal that AA information is required when requesting media segments.

In an embodiment, AA information comprises an AA system identifier (ID) and AA tokens. The AA system ID is used for identifying a particular AA system such as the AA system 200. The AA tokens are issued by the AA systems and comprise encoded opaque strings. An AA system ID and an AA token issued by an AA system identified by the AA system ID together form an AA identification pair. A DASH system may comprise any number of AA identification pairs.

An MPD may include an UrlQueryInfo element to signal that an AA system ID and an AA token are required for media segment requests. To facilitate AA information signaling and exchange, an AASystemId parameter and an AAToken parameter are defined to represent an AA system ID and an AAToken, respectively. The AASystemId and the AAToken parameters may optionally include a segment variant, denoted as AAToken{$Number$} and AATokenURL{$Number$}, respectively, to indicate that the AA tokens and URLs for retrieving AA tokens are segment-dependent. Thus, AAToken, AAToken1, AAToken2, AATokenURL, AATokenURL1, and AATokenURL2 are valid URL parameters. The UrlQueryInfo element may include URL substitution parameter identifiers $AASystemId$ and $AAToken$ to request a DASH client such as the DASH client 220 to substitute $AASystemId$ and $AAToken$ with values of AASystemId and AAToken, respectively. The URL substitution parameters names and identifiers are summarized in the following tables:

TABLE 1

Summary of URL Substitution Parameters for AA

| $<Identifier>$ | Substitution Parameter Descriptions |
|---|---|
| $AASystemId$ | The identifier is substituted by the identifier of the underlying AA system. |
| $AAToken$ | The identifier is substituted by the AA token obtained in the underlying AA system. |

TABLE 2

Summary of URL Parameter Names for AA

| Parameter Name | Description |
|---|---|
| AASystemId | The value for this parameter is an ID of an AA system. |
| AAToken{$Number$} | The value for this parameter is an encoded token in a corresponding AA system. The substitution parameter $Number$ is optional, allowing specification of segment-variant (or segment-dependent) tokens. |
| AATokenURL{$Number$} | The value for this parameter should be an URL for retrieving Tokens in its associated AA System. The substitution parameter $Number$ is optional, allowing specification of segment-variant token URLs. |

FIG. 9 illustrates an embodiment of a URL template 900 signaling AA schemes 911, 912, 913, and 914 in an MPD. The URL template 900 is generated by a media presentation preparation server such as the media presentation preparation server 110 and stored as a portion of an MPD in an MPD server such as the MPD server 120 when employing AA for streaming, as described more fully below in the method 1600. The AA schemes 911, 912, 913, and 914 are identified by AA system IDs 921, 922, 923, and 924, respectively. The AA schemes 911-914 may provide information associated with AA systems that issue AA tokens, AA protocols, and/or AA standards. In some embodiments, the schemes 911-914 may indicate separate schemes for authentication and authorization. For example, a DASH client such as the DASH client 220 requests AA tokens from an AA system such as the AA system 200 according to one of the schemes 911-914.

FIG. 10 illustrates an embodiment of a URL template 1000 signaling an AA token 1011 and an AA token URL 1012. The URL template 1000 is generated by a media presentation preparation server such as the media presentation preparation server 110 and stored as a portion of an MPD in an MPD server such as the MPD server 120 when employing AA for streaming, as described more fully below in the method 1600. The AA token 1011 indicates an AA token string. The AA token URL 1012 indicates an URL where AA tokens may be retrieved. For example, a DASH client such as the DASH client 220 may provide the AA token 1011 to a DASH content server such as the DASH content server 231 when requesting media segments. Alternatively, a DASH client may retrieve an AA token from the AA token URL and provide the retrieved AA token to a DASH content server when requesting media segments.

FIG. 11 illustrates an embodiment of a URL template 1100 indicating an URL query information element 1101 for querying segment-independent AA information. The URL template 1100 is generated by a media presentation preparation server such as the media presentation preparation server 110 and stored as a portion of an MPD in an MPD server such as the MPD server 120 when employing AA for streaming, as described more fully below in the method 1600. The URL query information element 1101 indicates that an AA system ID and a segment-independent AA token is required when requesting media segments from a DASH content server such as the DASH content server 231.

FIG. 12 illustrates another embodiment of a URL template 1200 indicating URL query information elements 1101, 1201 and 1202 for querying segment-independent AA information. The URL template 1200 is generated by a media presentation preparation server such as the media presentation preparation server 110 and stored as a portion of an MPD in an MPD server such as the MPD server 120 when employing AA for streaming, as described more fully below in the method 1600. The URL query information elements 1201 and 1202 indicate multiple segment-independent tokens are required when requesting media segments from a DASH content server such as the DASH content server 231.

Figure 13:
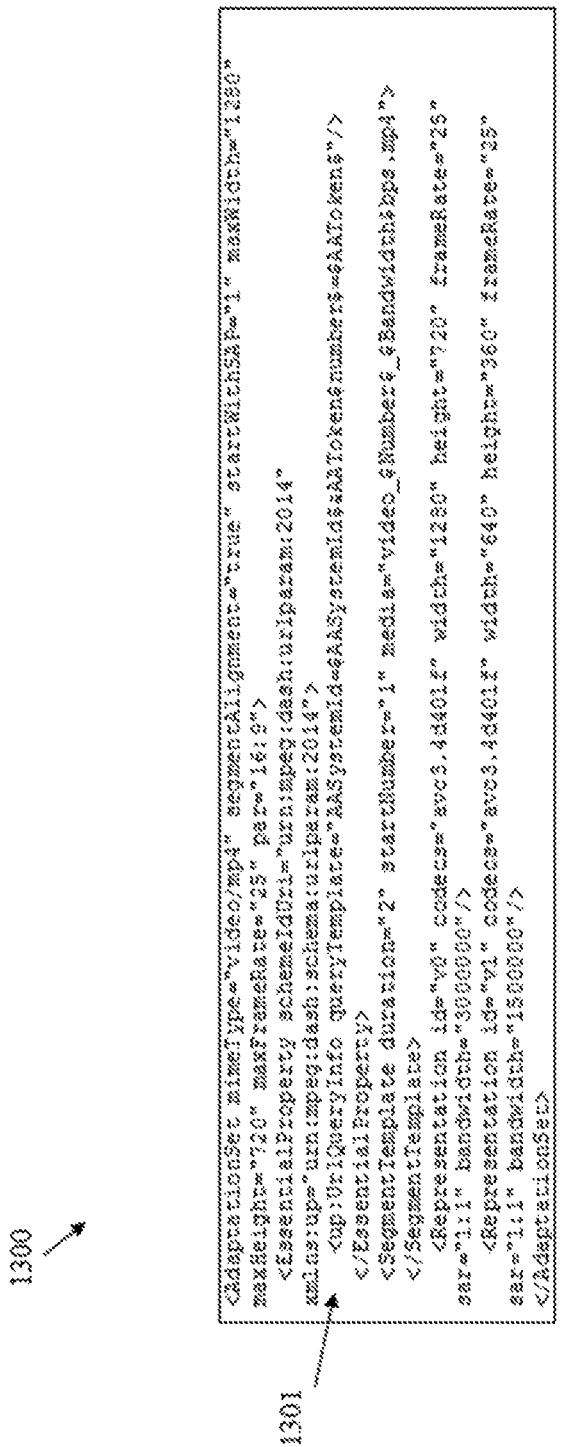
FIG. 13 illustrates another embodiment of a URL template indicating an URL query information element for querying segment-dependent AA information.

FIG. 13 illustrates another embodiment of a URL template 1300 indicating an URL query information element 1301 for querying segment-dependent AA information. The URL template 1300 is generated by a media presentation preparation server such as the media presentation preparation server 110 and stored as a portion of an MPD in an MPD server such as the MPD server 120 when employing AA for streaming, as described more fully below in the method 1600. The URL query information element 1301 indicates segment-dependent tokens are required when requesting media segments from a DASH content server such as the DASH content server 231.

Figure 14:
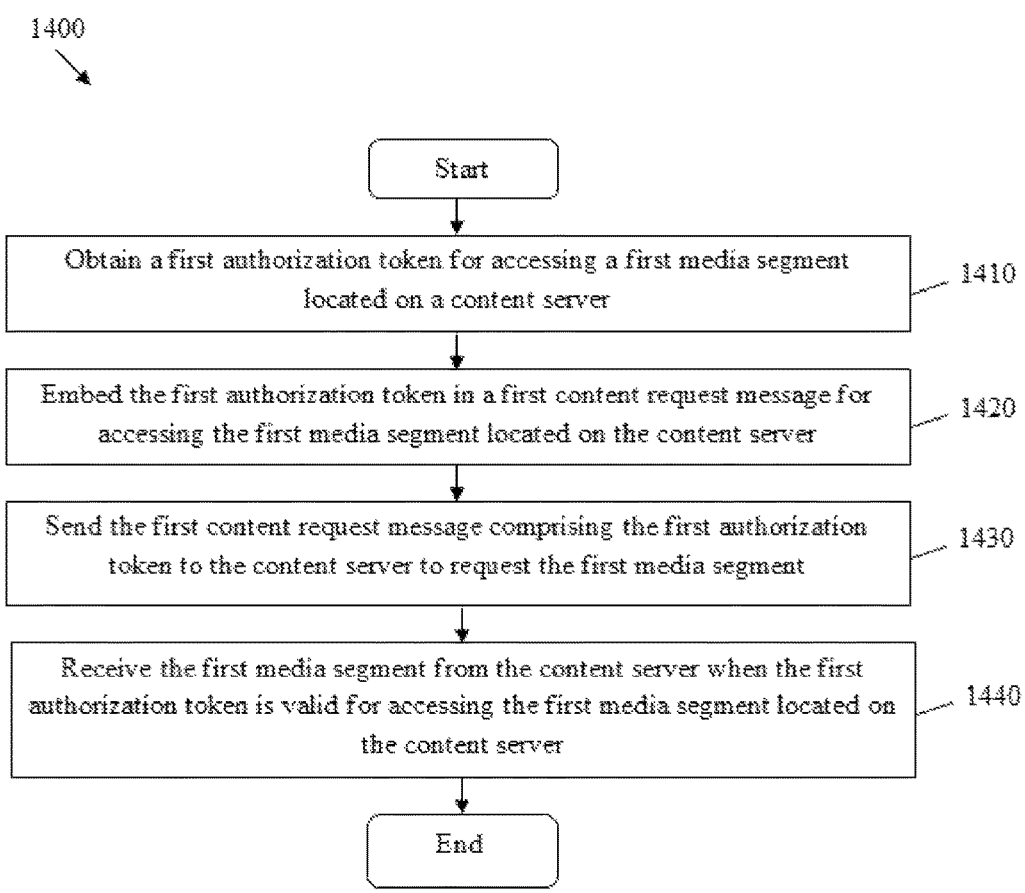
FIG. 14 is a flowchart of an embodiment of a method of requesting media content.

In one embodiment, a DASH client such as the DASH client 220 receives the URL templates 900, 1000, and 1100 from an MPD server such as the MPD server 120. The DASH client selects an AA system ID, e.g., "urn:org:example:plan-c", from the template 900 and an AA token, e.g., "nitfHRCrtziwO2HwPfWw~yYD" from the template 1000. Subsequently, the DASH client substitutes the $AASystemId$ and the $AAToken$ parameters with the selected AA System ID and the selected AA token when building a segment request URL, respectively, as shown below:

http://www.example.com/dash/
video_1_3000000bps.mp4?AASystemId=urn:org:example:plan-c&AAToken=nitfHRCrtziwO2HwPfWw~yYD
http://www.example.com/dash/
video_2_3000000bps.mp4?AASystemId=urn:org:example:plan-c&AAToken=nitfHRCrtziwO2HwPfWw~yYD
http://www.example.com/dash/
video_3_3000000bps.mp4?AASystemId=urn:org:example:plan-c&AAToken=nitfHRCrtziwO2HwPfWw~yYD In another embodiment, a DASH client such as the DASH client 220 receives the URL templates 900, 1000, and 1300 from an MPD server such as the MPD server 120. The DASH client selects an AA system ID, e.g., "urn:org:example:plan-c", from the template 900 and selects an AA token, e.g., "i_nitfHRCrtziwO2HwPfWw~yYD" from the template 1000 for each $i^{th}$ media segment. Subsequently, the DASH client substitutes the $AASystemId$ and the $AATokeni$ parameters with the selected AA System ID and the selected AA token when building a segment request URL, respectively, as shown below:

http://www.example.com/dash/
video_1_3000000bps.mp4?AASystemId=urn:org:example:plan-c&AAToken1=1_nitfHRCrtziwO2HwPfWw~yYD
http://www.example.com/dash/
video_2_3000000bps.mp4?AASystemId=urn:org:example:plan-c&AAToken2=2_nitfHRCrtziwO2HwPfWw~yYD
http://www.example.com/dash/
video_3_3000000bps.mp4?AASystemId=urn:org:example:plan-c&AAToken3=3_nitfHRCrtziwO2HwPfWw~yYD FIG. 14 is a flowchart of an embodiment of a method 1400 of requesting media content. The method 1400 is implemented by a streaming client such as the DASH clients 140 and 220, which may be implemented as the NE 300. The method 1400 employs similar mechanisms as the methods 500, 600, 700, and 800. The method 1400 is implemented when the streaming client requests media segments. At step 1410, a first authorization token is obtained for accessing a first media segment located on a content server such as the DASH content servers 130 and 231. At step 1420, the first authorization token is embedded in a first content request message for accessing the first media segment located on the content server. At step 1430, the first content request message comprising the first authorization token is sent to the content server to request the first media segment. At step 1440, the first media segment is received from the content server when the first authorization token is valid for accessing the first media segment located on the content server.

Figure 15:
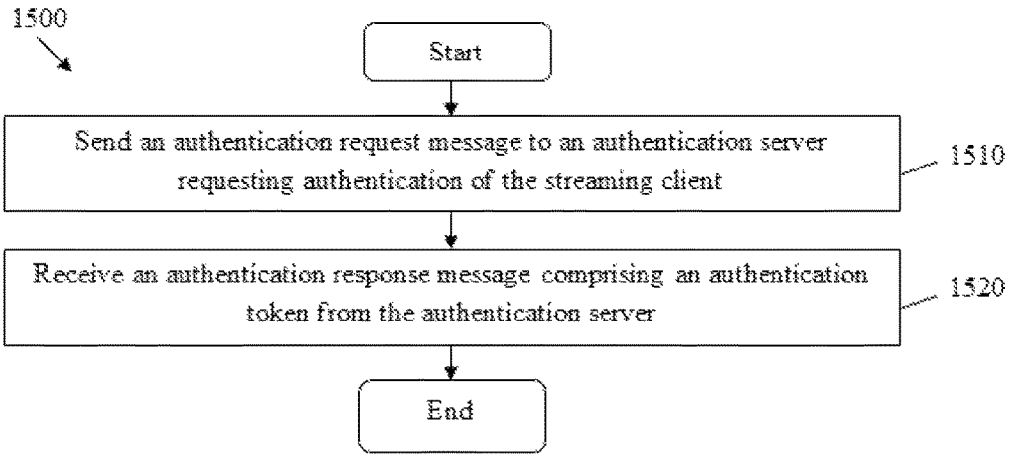
FIG. 15 is a flowchart of an embodiment of a method of requesting an authentication token.

FIG. 15 is a flowchart of an embodiment of a method 1500 of requesting an authentication token. The method 1500 is implemented by a streaming client such as the DASH clients 140 and 220, which may be implemented as the NE 300. The method 1500 employs similar mechanisms as the method 400. The method 1500 is implemented before the streaming client may request any media content. At step 1510, an authentication request message is sent to an authentication server requesting authentication of the streaming client. At step 1520, an authentication response message comprising an authentication token is received from the authentication server.

Figure 16:
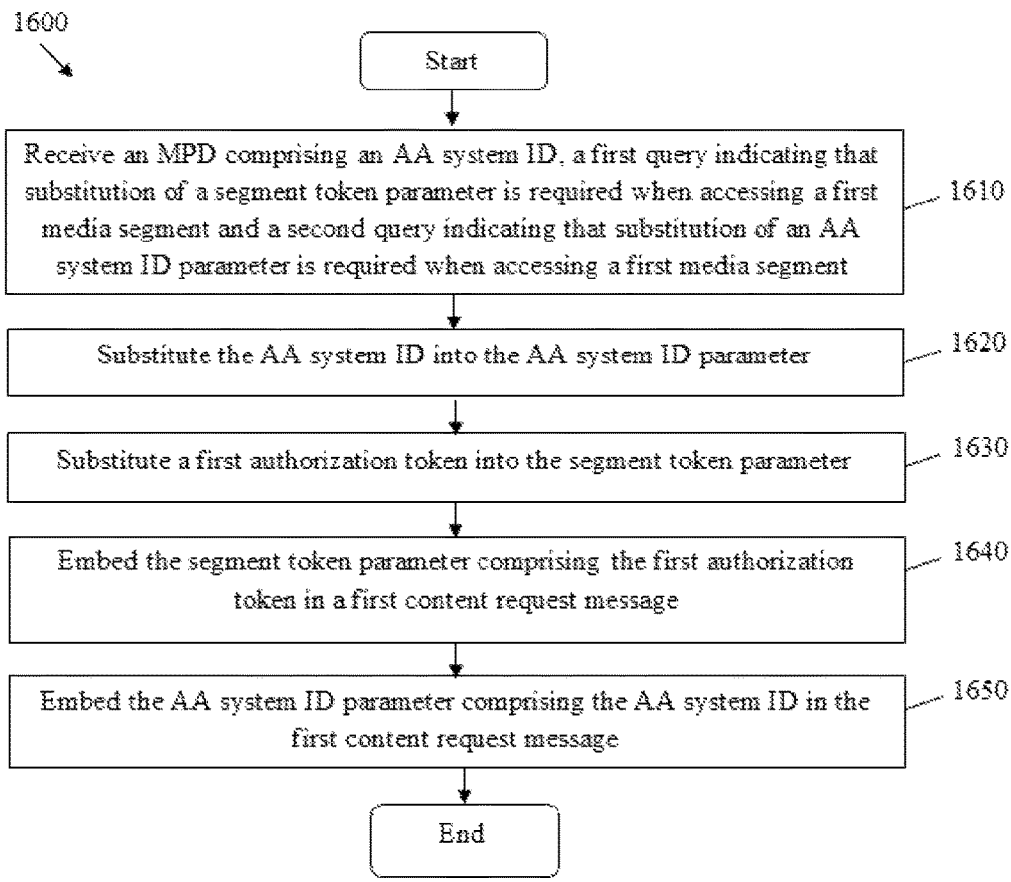
FIG. 16 is a flowchart of an embodiment of a method of generating a content request.

FIG. 16 is a flowchart of an embodiment of a method 1600 of generating a content request. The method 1600 is implemented by a streaming client such as the DASH clients 140 and 220, which may be implemented as the NE 300. The method 1600 employs signaling mechanisms described in the URL templates 900-1300. The method 1600 is implemented after the streaming client completes authentication by employing the method 1500. At step 1610, an MPD is received. The MPD comprises an AA system ID, a first query indicating that substitution of a segment token parameter is required when accessing a first media segment and a second query that requires substitution of an AA system ID parameter when accessing the first media segment. For example, the first media segment is stored on a content server similar to the DASH content servers 130 and 231. The MPD may be similar to the URL templates 900-1300. The AA system ID may be similar to the AA system IDs 921-924. The first query and the second query are similar to the URL query information elements 1101, 1201, 1202, and 1301.

At step 1620, the AA system ID is substituted into the AA system ID parameter. At step 1630, a first authorization token is substituted into the segment token parameter. The first authorization token may be retrieved directly from the MPD when the MPD carries the first authorization token, for example, as shown in the URL template 1000, where the AA token 1011 is an encode string embedded in the URL template 1000. Alternatively, the MPD may indicate an authorization server similar to the AA token URL 1012 and the first authorization token may be obtained from the authorization server.

At step 1640, the segment token parameter comprising the first authorization token is embedded in a first content request message. At step 1650, the AA system ID parameter comprising the AA system ID is embedded in the first content request message. Subsequently, the streaming client may send the first content request message to the content server to request the first media segment. It should be noted that the MPD may include other query parameters to indicate that other tokens are required for accessing other segments on the content server or obtaining a DRM license, for example, as described in the methods 500-800. In addition, the order of the steps in the method 1600 may be implemented as shown or alternatively configured as determined by a person of ordinary skill in the art to achieve similar functionalities. Some of the steps such as the steps 1620-1650 may be implemented during a streaming session.

Figure 17:
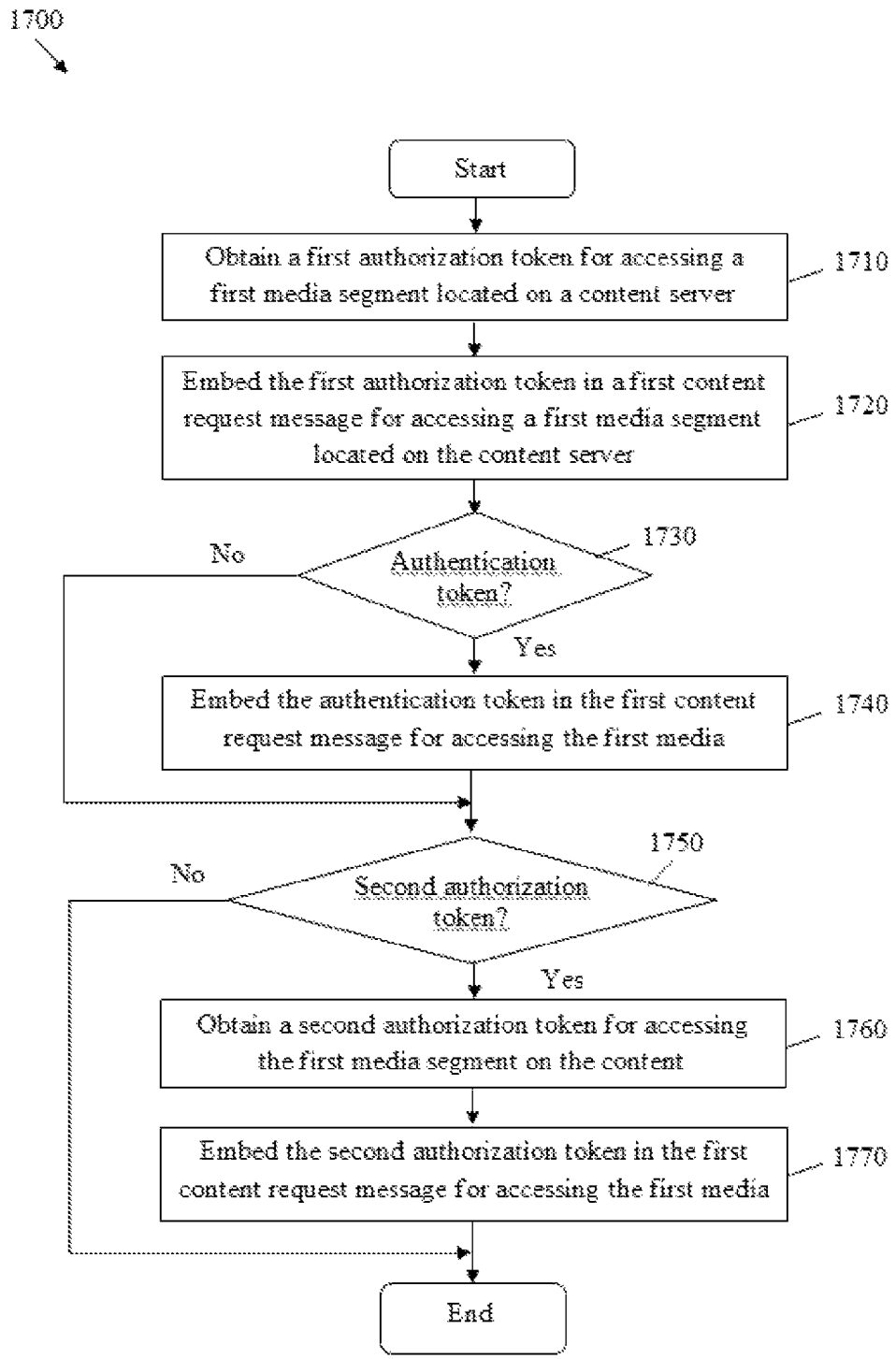
FIG. 17 is a flowchart of another embodiment of a method of generating a content request.

FIG. 17 is a flowchart of another embodiment of a method 1700 of generating a content request. The method 1700 is implemented by a streaming client such as the DASH clients 140 and 220, which may be implemented as the NE 300. The method 1700 employs signaling mechanisms as in the methods 500-800. The method 1700 is implemented after the streaming client obtains an authentication token by employing the method 1500 and receiving an MPD comprising templates similar to the URL templates 900-1300. At step 1710, a first authorization token is obtained for accessing a first media segment located on a content server such as the DASH client servers 130 and 231. The first authorization token may be retrieved from the MPD or obtained from an authorization server, for example, indicated by the MPD. At step 1720, the first authorization token is embedded in a first content request message for accessing a first media segment located on the content server.

At step 1730, a determination is made whether an authentication token is required for accessing the first media segment on the content server, for example, according to queries in the MPD such as the URL query information elements 1101, 1201, 1202, and 1301. When determining that an authentication token is required, the method 1700 proceeds to step 1740. At step 1740, the authentication token is embedded in the first content request message for accessing the first media. For example, the step 1740 may be employed by the method 600 to generate the media segment request at step 610.

When determining that an authentication token is not required, the method 1700 proceeds to step 1750. At step 1750, a determination is made whether a second authorization token is required for accessing the first media segment on the content server, for example, according to queries in the MPD such as the URL query information elements 1101, 1201, 1202, and 1301. When determining that a second authorization token is required, the method 1700 proceeds to step 1760. At step 1760, a second authorization token is obtained for accessing the first media segment on the content server. For example, the first authorization token may be a long-term token associated with the first media segment and the second authorization token may be a short-term token associated with the streaming client or a streaming session. At step 1770, the second authorization token is embedded in the first content request message for accessing the first media. For example, the steps 1760 and 1770 may be employed by the method 700 to generate the media segment request at step 710. Subsequently, the streaming client may send the first content request message to the content server to request the first media segment. The method 1700 may be repeated for different media segments during a streaming session. When the MPD indicates that segment-dependent tokens are required for accessing different media segments, the first authorization token may be different for different media segments. It should be noted that the order of the steps shown in the method 1700 may be implemented as shown or alternatively configured as determined by a person of ordinary skill in the art to achieve similar functionalities.

Figure 18:
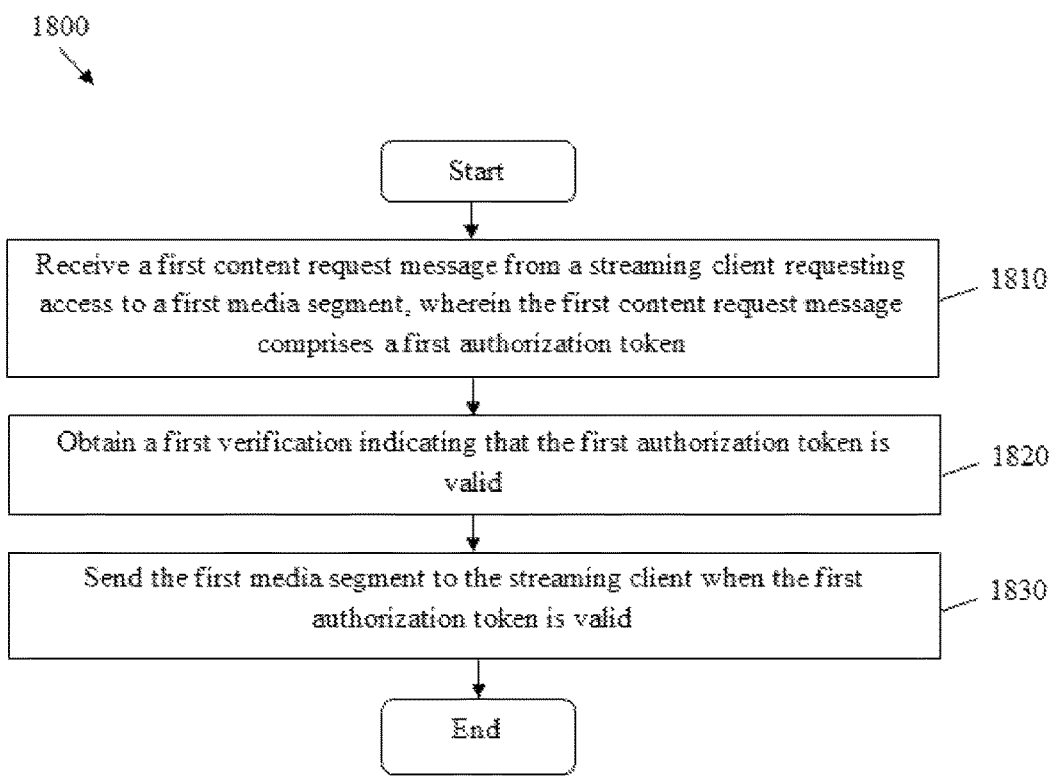
FIG. 18 is a flowchart of an embodiment of a method of granting content access.

FIG. 18 is a flowchart of an embodiment of a method 1800 of granting content access in a streaming system such as the system 200. The method 1800 is implemented by a streaming content server such as the DASH content servers 130 and 231, which may be implemented as the NE 300. The method 1800 employs similar mechanisms as in the methods 500-800. The method 1800 begins at step 1810 when a content request message is received from a streaming client requesting access to a first media segment located on the content server. The first content request message comprises a first authorization token similar to the AA token 1011. At step 1820, a first verification is obtained indicating that the first authorization token is valid. For example, the content server may request a verification server to validate the first authorization token and the verification server may provide the verification as shown in the methods 500-800. At step 1830, the first media segment is sent to the streaming client when the first authorization token is valid.

In an embodiment, a NE includes means for obtaining a first authorization token for accessing a first media segment located on a content server, means for embedding the first authorization token in a first content request message for accessing the first media segment located on the content server, means for sending, to the content server, the first content request message comprising the first authorization token to request the first media segment, and means for receiving, from the content server, the first media segment when the first authorization token is valid for accessing the first media segment located on the content server.

In an embodiment, a NE includes means for receiving a first content request message from a streaming client requesting access to a first media segment, wherein the first content request message comprises a first authorization token, means for obtaining a first verification indicating that the first authorization token is valid, and means for sending the first media segment to the streaming client when the first authorization token is valid.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) configured as a streaming client, the method comprising:
   sending, via a transmitter to an authentication server, an authentication request message requesting authentication of the streaming client;
   receiving, via a receiver from the authentication server, an authentication response message comprising an authentication token;
   obtaining, via a processor of the NE, a first authorization token for accessing a first media segment located on a content server;
   receiving, via the receiver, a media presentation descriptor (MPD) associated with the first media segment after the authentication response message is received, the MPD comprising a first query indicating that substitution of a segment token parameter is required when accessing the first media segment, an authentication and authorization (AA) system identifier (ID), and a second query indicating that substitution of an AA system ID parameter is required when accessing the first media segment;
   embedding, via the processor, the authentication token and the first authorization token in a first content request message for accessing the first media segment located on the content server, the embedding including substituting the first authorization token into the segment token parameter and embedding the segment token parameter comprising the first authorization token in the first content request message;
   substituting the AA system ID into the AA system ID parameter;
   embedding the AA system ID parameter in the first content request message before sending the first content request message;
   sending, via a transmitter of the NE to the content server, the first content request message comprising the authentication token and the first authorization token to request the first media segment; and
   receiving, via a receiver of the NE from the content server, the first media segment when the authentication token and the first authorization token are both valid.

2. The method of claim 1, further comprising embedding the authentication token in the first content request message before sending the first content request message to the content server, wherein the first media segment is further received when the authentication token is valid for accessing the first media segment on the content server.

3. The method of claim 1, wherein the MPD further comprises the first authorization token for accessing the first media segment on the content server, and wherein the first authorization token is obtained from the MPD.

4. The method of claim 1, wherein the MPD further comprises a uniform resource locator (URL) identifying an authorization server, and wherein obtaining the first authorization token comprises:
   sending, via the transmitter to the authorization server according to the URL, an authorization request message requesting authorization of the streaming client for accessing the first media segment; and
   receiving, via the receiver, from the authentication server, an authorization response message comprising the first authorization token.

5. The method of claim 1, wherein the first query further indicates that the segment token parameter is segment dependent, and wherein the method further comprises:
   obtaining, via the processor, a second authorization token for accessing a second media segment located on the content server;
   substituting the second authorization token into the segment token parameter;
   embedding, via the processor, the segment token parameter comprising the second authorization token in a second content request message for accessing the second media segment located on the content server;
   sending, via the transmitter to the content server, the second content request message comprising the second authorization token to request the second media segment; and
   receiving, via the receiver from the content server, the second media segment from the content server when the second authorization token is valid for accessing the second media segment located on the content server.

6. The method of claim 5, wherein the first authorization token and the second authorization token are same.

7. A network element (NE) configured to implement a streaming client, the NE comprising:
   a processor configured to:
      obtain an authentication token for authenticating the streaming client and a first authorization token for accessing a first media segment located on a content server;
      embed the authentication token and the first authorization token in a first content request message for accessing the first media segment located on the content server;
      obtain a client authorization token associated with the streaming client, wherein the client authorization token and the first authorization token are valid for different durations; and
      embed the client authorization token in the first content request message before sending the first content request message to the content server;
   a transmitter coupled to the processor and configured to send, to the content server, the first content request message comprising the authentication token and the first authorization token to request the first media segment; and
   a receiver coupled to the processor and configured to receive, from the content server, the first media segment when the authentication token and the first authorization token are both valid, the first media segment received when the client authorization token is valid for the streaming client to access the first media segment located on the content server.

8. The NE of claim 7, wherein the transmitter is further configured to send, to an authentication server, an authentication request message requesting authentication of the streaming client, and wherein the receiver is further configured to receive, from the authentication server, an authentication response message comprising the authentication token before obtaining the first authorization token.

9. The NE of claim 8, wherein the receiver is further configured to receive a media presentation descriptor (MPD) associated with the first media segment after receiving the authentication response message, wherein the MPD comprises information associated with retrieval of the first authorization token, and wherein the processor is further configured to obtain the first authorization token according to the information in the MPD.

10. The NE of claim 7, wherein the first authorization token is not valid for accessing a second media segment located on the content server, wherein the processor is further configured to:
obtain a second authorization token for accessing the second media segment on the content server; and
embed the second authorization token in a second content request message for accessing the second media segment located on the content server,
wherein the transmitter is further configured to send, to the content server, the second content request message comprising the second authorization token to request the second media segment, and
wherein the receiver is further configured to receive, from the content server, the second media segment when the second authorization token is valid for accessing the second media segment on the content server.

11. The NE of claim 7, wherein the processor is further configured to:
obtain a third authorization token for obtaining a digital right management (DRM) license associated with the first media segment located on the content server; and
embed the third authorization token in a DRM license request message for obtaining the DRM license,
wherein the transmitter is further configured to send the DRM license request message comprising the third authorization token to request the DRM license, and
wherein the receiver is further configured to receive the DRM license when the third authorization token is valid for obtaining the DRM license.

12. A network element (NE) configured to implement a content server, the NE comprising:
a receiver configured to receive a first content request message from a streaming client requesting access to a first media segment, wherein the first content request message comprises an authentication token, a first authorization token, and a second authorization token, the first authorization token valid for a first period of time associated with the first media segment, the second authorization token associated with the first media segment and valid for a second period of time;
a processor coupled to the receiver and configured to obtain a first verification indicating that the first authorization token is valid and to obtain a second verification indicating that the second authorization token is valid; and
a transmitter coupled to the processor and configured to send the first media segment to the streaming client when the first authorization token is valid and to send the first media segment to the streaming client when the second authorization token is valid.

13. The NE of claim 12, wherein the processor is further configured to obtain a third verification indicating that the authentication token is valid, and wherein the transmitter is further configured to send the first media segment to the streaming client when the authentication token is valid.

14. The NE of claim 12, wherein the first authorization token is not valid for accessing a second media segment, wherein the receiver is further configured to receive a second content request message from the streaming client requesting access to the second media segment, wherein the second content request message comprises a segment-dependent authorization token, wherein the processor is further configured to obtain a fourth verification indicating that the segment-dependent authorization token is valid, and wherein the transmitter is further configured to send the second media segment to the streaming client when the segment-dependent authorization token is valid.

15. The NE of claim 12, wherein the NE is a dynamic adaptive streaming over hypertext transfer protocol (HTTP) (DASH) server.

* * * * *